United States Patent
Shi et al.

(10) Patent No.: US 11,715,425 B2
(45) Date of Patent: Aug. 1, 2023

(54) DISPLAY METHOD, DISPLAY DEVICE, DISPLAY SYSTEM AND STORAGE MEDIUM

(71) Applicants: Beijing BOE Optoelectronics Technology Co., Ltd., Beijing (CN); BOE Technology Group Co., Ltd., Beijing (CN)

(72) Inventors: Tiankuo Shi, Beijing (CN); Yifan Hou, Beijing (CN); Zhihua Ji, Beijing (CN); Xiaomang Zhang, Beijing (CN); Wei Sun, Beijing (CN); Rui Liu, Beijing (CN); Minglei Chu, Beijing (CN); Xue Dong, Beijing (CN); Hao Zhang, Beijing (CN); Lili Chen, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/556,678

(22) Filed: Dec. 20, 2021

(65) Prior Publication Data

US 2022/0223110 A1 Jul. 14, 2022

(30) Foreign Application Priority Data

Jan. 14, 2021 (CN) .......................... 202110051224.5

(51) Int. Cl.
*G09G 3/3266* (2016.01)
*G09G 3/36* (2006.01)
*G09G 5/00* (2006.01)

(52) U.S. Cl.
CPC ......... *G09G 3/3266* (2013.01); *G09G 3/3618* (2013.01); *G09G 5/001* (2013.01); *G09G 2360/18* (2013.01)

(58) Field of Classification Search
CPC .... G09G 3/3266; G09G 3/3618; G09G 5/001; G09G 2360/18; G09G 3/20;
(Continued)

(56) References Cited

U.S. PATENT DOCUMENTS

2017/0249745 A1* 8/2017 Fiala ........................ A63F 13/65
2018/0268611 A1* 9/2018 Nourai .................. G06T 15/005
(Continued)

FOREIGN PATENT DOCUMENTS

CN 109388448 A 2/2019

*Primary Examiner* — Sahlu Okebato
(74) *Attorney, Agent, or Firm* — IPro, PLLC

(57) ABSTRACT

A display method, a display device, a display system, and a storage medium are provided. The display method includes: obtaining a first fixation coordinate transmitted by an image acquisition device, and obtaining a second fixation coordinate and a current frame of image that are transmitted by a first processor; performing refresh and display by using the current frame of image; determining a type of the current frame of image, and determining, based on the type, whether the first fixation coordinate changes abnormally; and performing refresh and display by using a previous frame of image for non-fixation region in a case that the first fixation coordinate changes abnormally, and performing refresh and display by using a next frame of image transmitted by the first processor in a case that the first fixation coordinate does not change abnormally.

20 Claims, 2 Drawing Sheets

(58) Field of Classification Search
CPC ....... G09G 2310/04; G09G 2320/0686; G09G 2340/0435; G09G 2354/00; G06T 19/006; G06F 3/013; G06M 1/27
See application file for complete search history.

(56) References Cited

U.S. PATENT DOCUMENTS

2019/0057647 A1* 2/2019 Hack ...................... G06F 3/013
2021/0225329 A1 7/2021 Shi et al.

\* cited by examiner transmission and display of
image for fixation region transmission and display of
image for non-fixation region

DISPLAY METHOD, DISPLAY DEVICE, DISPLAY SYSTEM AND STORAGE MEDIUM

CROSS-REFERENCE TO RELATED APPLICATION

This application claims priority to Chinese Patent Application No. 202110051224.5 filed on Jan. 14, 2021, which is incorporated in its entirety by reference herein.

TECHNICAL FIELD

The present disclosure relates to the field of AR/VR technologies. The present disclosure provides a display method, a display device, a display system, and a storage medium.

BACKGROUND

Augmented Reality (AR) technology is a relatively new technology that promotes the integration of content of real world information and content of virtual world information. AR technology is increasingly applied to various industries, such as education, training, healthcare, design and advertising. Virtual Reality (VR) technology provides a computer simulation system that can create and experience virtual worlds, which can be used in fields such as medicine, entertainment, games, military aerospace, and exhibitions.

SUMMARY

In a first aspect, embodiments of the present disclosure provide a display method, the method including:

obtaining a first fixation coordinate transmitted by an image acquisition device, and obtaining a second fixation coordinate and a current frame of image that are transmitted by a first processor, where the current frame of image is an image for fixation region or an image for non-fixation region generated by the first processor based on the second fixation coordinate;

performing refresh and display by using the current frame of image;

determining a type of the current frame of image, and determining, based on the type, whether the first fixation coordinate changes abnormally; and performing refresh and display by using a previous frame of image for non-fixation region in a case that the first fixation coordinate changes abnormally, and performing refresh and display by using a next frame of image transmitted by the first processor in a case that the first fixation coordinate does not change abnormally.

In some embodiments, the determining the type of the current frame of image, and determining, based on the type, whether the first fixation coordinate changes abnormally includes:

in a case that the type of the current frame of image is the image for fixation region, after the number of rows refreshed for display is greater than a first preset value and when a first preset condition is met, determining that the first fixation coordinate changes abnormally;

where the first preset condition includes: when the first fixation coordinate is updated and a value of a difference between the updated first fixation coordinate and the second fixation coordinate is greater than a first threshold, it is determined whether the next frame of image is an image for fixation region; and the next frame of image is an image for fixation region, there is a difference between the updated first fixation coordinate and the second fixation coordinate, and the value of the difference is greater than a second threshold.

In some embodiments, the determining the type of the current frame of image, and determining, based on the type, whether the first fixation coordinate changes abnormally includes:

in a case that the type of the current frame of image is the image for non-fixation region, after the number of rows refreshed for display is greater than a second preset value and when a second preset condition is met, determining that the first fixation coordinate changes abnormally;

where the second preset condition includes: the first fixation coordinate is updated; and the next frame of image is an image for fixation region, and a value of a difference between the updated first fixation coordinate and the second fixation coordinate is greater than a third threshold.

In some embodiments, in a case that the current frame of image is the image for fixation region, the performing refresh and display by using the current frame of image includes:

scanning, by a row scan controller, pixels in each row for the image for fixation region, and turning off a column scan controller corresponding to an image for non-fixation region in the same row as the image for fixation region.

In some embodiments, in a case that the current frame of image is the image for non-fixation region, the performing refresh and display by using the current frame of image includes:

scanning, by a row scan controller, according to a preset number of rows simultaneously to perform refresh by using the image for non-fixation region so as to display the image for non-fixation region in pixels in a non-fixation region of an entire display panel of a display device, and storing the current frame of image for non-fixation region.

In some embodiments, where in a case that the number of images for fixation region continuously used for performing refresh and display reaches a preset number of frames, performing refresh and display by using a previous frame of image for non-fixation region.

In a second aspect, embodiments of the present disclosure provide a display device, including:

an obtaining module, configured to obtain a first fixation coordinate transmitted by an image acquisition device, and obtain a second fixation coordinate and a current frame of image that are transmitted by a first processor, where the current frame of image is an image for fixation region or an image for non-fixation region generated by the first processor based on the second fixation coordinate;

a determining module, configured to determine a type of the current frame of image, and determine, based on the type, whether the first fixation coordinate changes abnormally; and a display module, configured to perform refresh and display by using the current frame of image; and perform refresh and display by using a previous frame of image for non-fixation region in a case that the first fixation coordinate changes abnormally, and perform refresh and display by using a next frame of image transmitted by the first processor in a case that the first fixation coordinate does not change abnormally.

In some embodiments, determining the type of the current frame of image, and determining, based on the type, whether the first fixation coordinate changes abnormally includes:

in a case that the type of the current frame of image is the image for fixation region, after the number of rows refreshed for display is greater than a first preset value and when a first preset condition is met, determining that the first fixation coordinate changes abnormally;

where the first preset condition includes: when the first fixation coordinate is updated and a value of a difference between the updated first fixation coordinate and the second fixation coordinate is greater than a first threshold, it is determined whether the next frame of image is an image for fixation region; and the next frame of image is an image for fixation region, there is a difference between the updated first fixation coordinate and the second fixation coordinate, and the value of the difference is greater than a second threshold.

In some embodiments, determining the type of the current frame of image, and determining, based on the type, whether the first fixation coordinate changes abnormally includes:

in a case that the type of the current frame of image is the image for non-fixation region, after the number of rows refreshed for display is greater than a second preset value and when a second preset condition is met, determining that the first fixation coordinate changes abnormally;

where the second preset condition includes: the first fixation coordinate is updated; and the next frame of image is an image for fixation region, and a value of a difference between the updated first fixation coordinate and the second fixation coordinate is greater than a third threshold.

In some embodiments, in a case that the current frame of image is the image for fixation region, the performing refresh and display by using the current frame of image includes:

scanning, by a row scan controller, pixels in each row for the image for fixation region, and turning off a column scan controller corresponding to an image for non-fixation region in the same row as the image for fixation region.

In some embodiments, in a case that the current frame of image is the image for non-fixation region, the performing refresh and display by using the current frame of image includes:

scanning, by a row scan controller, according to a preset number of rows simultaneously to perform refresh by using the image for non-fixation region so as to display the image for non-fixation region in pixels in a non-fixation region of an entire display panel of a display device, and storing the current frame of image for non-fixation region.

In some embodiments, in a case that the number of images for fixation region continuously used for performing refresh and display reaches a preset number of frames, performing refresh and display by using a previous frame of image for non-fixation region.

In a third aspect, embodiments of the present disclosure provide a storage medium having a program stored thereon, where the program, when executed by one or more processors, performs the method as described in the first aspect.

In a fourth aspect, embodiments of the present disclosure provide a display device, the display device including a display panel, a memory, and a second processor, where the memory stores a program, and the program, when executed by the second processor, performs the method as described in the first aspect.

In a fifth aspect, embodiments of the present disclosure provide a display system, including:

the display device as described in the fourth aspect, an image acquisition device and a first processor;

where the image acquisition device is configured to capture a fixation coordinate, and transmit the fixation coordinate to the display device and the first processor;

where the first processor is connected to the image acquisition device and the display device, and is configured to obtain the fixation coordinate transmitted by the image acquisition device, and transmit, to the display device, the fixation coordinate obtained from the image acquisition device and the current frame of image that is to be displayed.

According to embodiments of the present disclosure, the display system is an augmented reality system or a virtual reality system.

BRIEF DESCRIPTION OF THE DRAWINGS

In order that the technical solutions of the embodiments of the present disclosure are more clearly described, the accompanying drawings required for describing the embodiments of the present disclosure will be briefly described. It will be apparent that the accompanying drawings in the following descriptions are merely some of the embodiments of the present disclosure, and other drawings may be obtained by those of ordinary skill in the art based on these drawings without any creative efforts.

DETAILED DESCRIPTION

Figure 1:
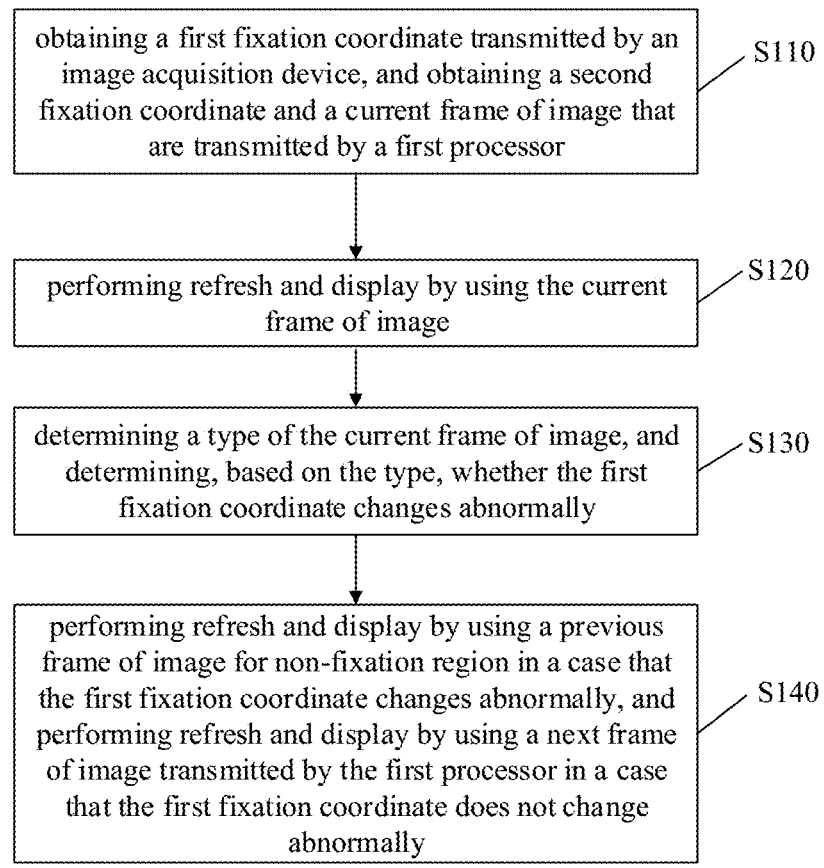
FIG. 1 is a flowchart of a display method provided by embodiments of the present disclosure.

The technical solutions in the embodiments of the present disclosure will be clearly and completely described hereinafter with reference to the drawings of the embodiments of the present disclosure. Apparently, the described embodiments are only a part rather than all of the embodiments of the present disclosure. Generally, components of the embodiments of the present disclosure described and illustrated in the drawings may be arranged and designed in a variety of different configurations. Therefore, the following detailed descriptions of the embodiments of the present disclosure provided in the accompanying drawings are not intended to limit the scope of the present disclosure, but merely represent some embodiments of the present disclosure. Based on the embodiments in the present disclosure, all other embodiments obtained by a person of ordinary skill in the art without any creative efforts fall within the protection scope of the present disclosure.

With the development of AR/VR technology, a coordinate of a fixation point is usually transmitted to a processor of an AR/VR system through an image acquisition device (such as a camera), and the processor of the AR/VR system may transmit, based on the coordinate of the fixation point, an image of a current scene in a real-time manner, to a display, to perform refresh for images for a fixation region and a non-fixation region respectively. However, when the human eye moves too fast, an error case in which the fixation coordinate of the human eye is inconsistent with the image for fixation region transmitted by the processor of the AR/VR system may occur. As a result, the visual effect of the display is incongruous. Therefore, it is needed to improve real-time perception of the display about the fixation point.

In related technologies, an AR/VR product adopts a solution of displaying an image for fixation region and an image for non-fixation region separately, which can realize that pixels in the fixation region and pixels in the non-fixation region refresh data successively without interfering with each other. In the solution in the related technologies, generally, the fixation coordinate is transmitted to the system processor of the AR/VR product; by sensing the position of the human eye and cooperating with the transmission scheme of the front-end system, the amount of transmitted data is reduced while ensuring the display effect of the fixation region. However, when the human eye moves too fast, an error case in which the fixation coordinate is inconsistent with the image for fixation region transmitted by the system processor may occur, resulting in incongruous visual effect.

Therefore, in the present disclosure, a fixation coordinate is collected at a high speed through an image acquisition device, and the fixation coordinate is transmitted directly to the display device while transmitted to a system processor, so that the coordinate directly transmitted to the display device and an image and the coordinate transmitted by the system processor are combined for determining whether there is abnormal fixation coordinate change such as fast eye movement, which achieves the purpose of improving the real-time perception of the display device about the fixation point, and effectively prevents incongruous visual effect caused by error transmission of an image for fixation region in a case of fast eye movement. FIG. 1 shows a flow chart of a display method, which is applied to a display device. As shown in FIG. 1, the display method provided in the embodiments includes the following steps.

Step S110 includes: obtaining a first fixation coordinate transmitted by an image acquisition device, and obtaining a second fixation coordinate and a current frame of image that are transmitted by a first processor, where the current frame of image is an image for fixation region or an image for non-fixation region generated by the first processor based on the second fixation coordinate.

Figure 2:
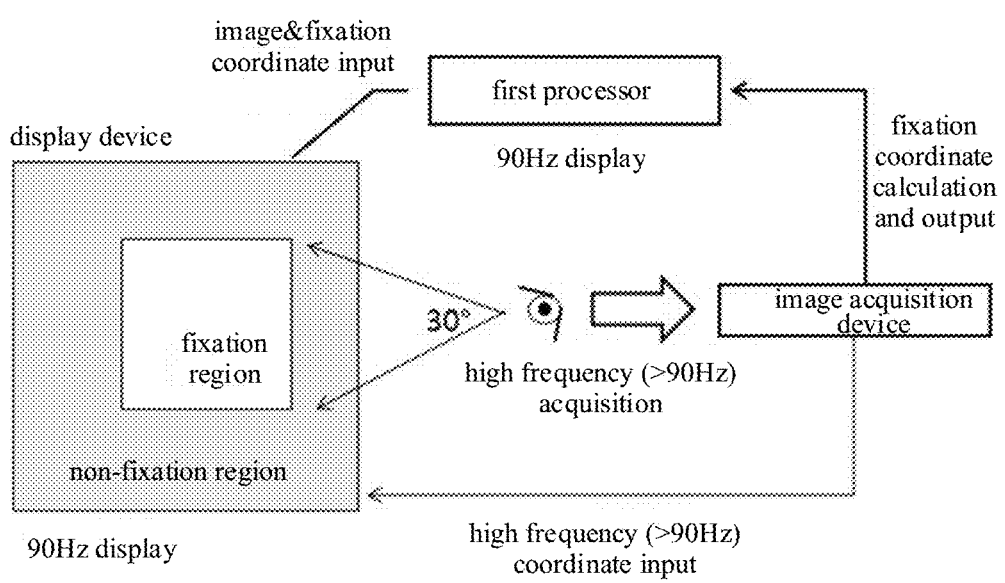
FIG. 2 is a schematic diagram of a display principle provided by embodiments of the present disclosure.

FIG. 2 shows a schematic diagram of the display principle of the method. The image acquisition device may be a device with an eye tracking function which can achieve high-speed refresh, for example, it may be a camera with an eye tracking function which has an acquisition frequency >90 Hz, or it may be an eye tracking unit including a camera module having an acquisition frequency >90 Hz and a post-processing module. Through the image acquisition device, the fixation coordinate of the human eye may be collected in real time, and the collected fixation coordinate may be transmitted to the first processor (the first processor may be a system processor of an AR/VR device) and the display device. The first processor determines, an image to be transmitted, according to the second fixation coordinate obtained from the image acquisition device and a current scene, and divides the image to be transmitted into two frames, an image for fixation region and an image for non-fixation region, for transmission, so as to achieve refresh and display for the image for non-fixation region and the image for fixation region separately without interfering with each other. Refresh is performed with the two frames separately, i.e., the image for fixation region and the image for non-fixation region. Refresh may be performed with one frame of image for fixation region and then refresh may be performed with one frame of image for non-fixation region; or; refresh may be performed with one frame of image for non-fixation region and then refresh may be performed with one frame of image for fixation region. The order for performing refresh is not uniquely limited. For example, when the first processor renders an image that needs to be transmitted to the display device, it may, obtain from rendering by using the fixation coordinate as the center, an image for fixation region that is smaller than a size of the display region of the display panel, according to the fixation coordinate and a preset size of the fixation region. The image for fixation region is subtracted from the image for the entire display region of the display panel to obtain the image for non-fixation region.

It is understandable that, in addition to transmitting the current frame of image that needs to be displayed by the display device and the second fixation coordinate, the first processor may also transmit data representing the format of the current frame of image (for example, a line of coded data used to represent the format of the current frame of image) to the display device. The format of the current frame of image includes an image for fixation region or an image for non-fixation region.

Step S120 includes: performing refresh and display by using the current frame of image.

It is understandable that the current frame of image is the image for fixation region or the image for non-fixation region. During the refresh and display process, the current frame of image is used to refresh the pixels of the display panel for display. Coordinates of each pixel may be presented by a row and a column where the pixel is located.

Figure 3:
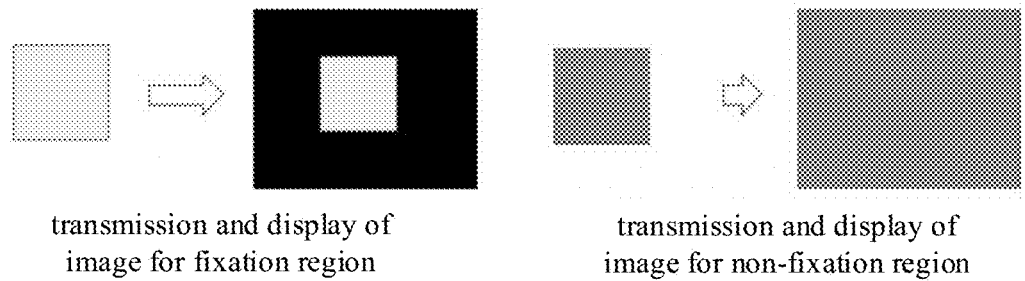
FIG. 3 is a schematic diagram of transmission and display of an image for fixation region and an image for non-fixation region provided by embodiments of the present disclosure.

FIG. 3 shows a schematic diagram of transmission and display of the image for fixation region and the image for non-fixation region. As shown in FIG. 3, after receiving the first fixation coordinate transmitted by the image acquisition device, the display device divides the region of the display panel into a fixation region and a non-fixation region according to the first fixation coordinate. In this way, when the current frame of image transmitted by the first processor is received, the display device refreshes corresponding pixels in the fixation region or corresponding pixels in the non-fixation region according to the current frame of image being the image for fixation region or the image for non-fixation region.

Specifically, the display device may determine whether the current frame of image is an image for fixation region or an image for non-fixation region according to the current frame of image and the data representing the format thereof that are transmitted by the first processor. In a case that the current frame of image is an image for fixation region, only pixels in the fixation region are refreshed, and pixels in the non-fixation region are not refreshed. In a case that the current frame of image is an image for non-fixation region, pixels in the non-fixation region of the entire display panel are refreshed, and this frame of image for non-fixation region is stored. It is understandable that, the image for non-fixation region which has been stored may be updated every time the image for non-fixation region is updated, so that it may be used by the display device to perform refresh to display a frame of image for non-fixation region when the first preset condition is met, or the second preset condition is met, or the number of images for fixation region continuously used for performing refresh and display reaches a preset number of frames.

In some embodiments, performing refresh and display with the current frame of image includes:

in a case that the current frame of image is the image for fixation region, scanning, by a row scan controller (gate), pixels in each row for the image for fixation region, and turning off a column scan controller (source) corresponding to an image for non-fixation region in the same row as the image for fixation region;

in a case that the current frame of image is the image for non-fixation region, scanning, by a row scan controller (gate), according to a preset number of rows simultaneously to perform refresh by using the image for non-fixation region so as to display the image for non-fixation region in pixels in a non-fixation region of an entire display panel of a display device, and storing the current frame of image for non-fixation region.

The preset number of rows may be 2 rows or more than 2 rows.

During performing refresh and display with the image for fixation region, the image for fixation region is scanned row by row, to display the image for fixation region to the fixation region of the display panel of the display device. At this time, the column scan controller corresponding to the non-fixation region is turned off. During performing refresh and display with the image for non-fixation region, pixels in the non-fixation region of the entire display panel need to be refreshed; in order to improve the refresh efficiency, multiple rows may be scanned simultaneously to quickly display the image for non-fixation region on the display panel of the display device. In this method of refresh and display, refresh can be performed with the image for fixation region and the image for non-fixation region separately without interfering with each other, and the amount of data transmitted is reduced; in addition, multiple rows can be scanned simultaneously in displaying the image for non-fixation region, which improves the efficiency of refresh and display.

It is understandable that every time there is an updated image for non-fixation region, the new image for non-fixation region is stored to replace the old image for non-fixation region. The latest frame of image for non-fixation region is stored, for being called when certain condition is met.

Step S130 includes: determining a type of the current frame of image, and determining, based on the type, whether the first fixation coordinate changes abnormally.

Step S140 includes: performing refresh and display by using a previous frame of image for non-fixation region in a case that the first fixation coordinate changes abnormally, and performing refresh and display by using a next frame of image transmitted by the first processor in a case that the first fixation coordinate does not change abnormally.

Step S130 may include: in a case that the type of the current frame of image is the image for fixation region, after the number of rows refreshed for display is greater than a first preset value, determining whether the first fixation coordinate changes abnormally according to a first preset condition.

The first preset value h1 may be a value greater than half of the total number of rows in the fixation region and smaller than the total number of rows in the fixation region. By detecting whether there is abnormal change in the first fixation coordinate when more than half of pixels of the fixation region are refreshed, fast eye movement can be detected in time. For example, in a case that the total number of rows in the fixation region is 100, the first preset value may be 60.

In practical applications, the display device may count, through a register H1, the number of rows that are refreshed for displayed, in a case that the current frame of image is an image for fixation region.

In some embodiments, determining whether the first fixation coordinate changes abnormally according to the first preset condition, further includes:

in a case that the first preset condition is met, determining that the first fixation coordinate changes abnormally.

The first preset condition includes: when the first fixation coordinate is updated and a value of a difference between the updated first fixation coordinate and the second fixation coordinate is greater than a first threshold, it is determined whether the next frame of image is an image for fixation region; and the next frame of image is an image for fixation region, there is a difference between the updated first fixation coordinate and the second fixation coordinate, and the value of the difference is greater than a second threshold.

The difference between the first fixation coordinate and the second fixation coordinate may be a row difference or a column difference, and the value of the difference is a difference between their row numbers or column numbers. That is, the value of the difference between the first fixation coordinate and the second fixation coordinate may be a difference between row numbers or column numbers of the first fixation coordinate and the second fixation coordinate. In a case that the difference between row numbers or column numbers exceeds the first threshold, the condition of being greater than the first threshold is met.

In practical applications, the display device may cache, through a register C, the first fixation coordinate transmitted by the image acquisition device and obtained by the display device. When there is an updated first fixation coordinate, the new first fixation coordinate replace the old first fixation coordinate.

When the first fixation coordinate is updated, it means that the human eye moves and the fixation coordinate changes accordingly. At this time, it is determined whether the value of the difference between the updated first fixation coordinate and the second fixation coordinate is greater than the first threshold TH1. In a case that it is greater than the first threshold TH1, it means that the human eye moves too quickly. In a case that it is not greater than the first threshold TH1, it means that the human eye moves normally. When it is greater than the first threshold TH1, it is determined whether the next frame of image is still an image for fixation region. If it is an image for fixation region, and it is further determined that there is a difference between the first fixation coordinate and the second fixation coordinate and the value of the difference is greater than the second threshold TH2, then, it is determined that the first fixation coordinate changes abnormally.

In a case that the first preset condition is not met, it is determined that the first fixation coordinate does not change abnormally. At this time, refresh continues to be performed with the next frame of image transmitted by the first processor.

Step S130 may include: in a case that the type of the current frame of image is the image for non-fixation region, after the number of rows refreshed for display is greater than a second preset value, determining whether the first fixation coordinate changes abnormally according to a second preset condition.

The second preset value h2 may be a value larger than half of the total number of pixel rows of the display panel and smaller than the total number of pixel rows of the display panel. By detecting whether there is abnormal change in the first fixation coordinate when more than half of the entire display panel is refreshed with the image for non-fixation region, too fast eye movement can be found in time. For example, the total number of pixel rows of the display panel is 200, and the second preset value may be 110.

In practical applications, the display device may count, through a register H2, the number of rows that are refreshed for displayed, in a case that the current frame of image is an image for non-fixation region.

In some embodiments, determining whether the first fixation coordinate changes abnormally according to the second preset condition, further includes:

in a case that the second preset condition is met, determining that the first fixation coordinate changes abnormally.

The second preset condition includes: the first fixation coordinate is updated; and the next frame of image is an image for fixation region, and a value of a difference between the updated first fixation coordinate and the second fixation coordinate is greater than a third threshold.

The difference between the first fixation coordinate and the second fixation coordinate may be a row difference or a column difference, and the value of the difference is a difference between their row numbers or column numbers. That is, the value of the difference between the first fixation coordinate and the second fixation coordinate may be a difference between row numbers or column numbers of the first fixation coordinate and the second fixation coordinate. In a case that the difference between row numbers or column numbers exceeds the second threshold, the condition of being greater than the second threshold is met.

In the case that the current frame of image is an image for non-fixation region, when the first fixation coordinate is updated, it means that the human eye moves and the fixation coordinate changes accordingly. At this time, it is determined whether the next frame of image is an image for fixation region. If it is an image for fixation region, and it is further determined that the value of the difference between the first fixation coordinate and the second fixation coordinate is greater than the third threshold TH3, then, it is determined that the first fixation coordinate changes abnormally.

By determining whether the first fixation coordinate changes abnormally in transitioning from the image for non-fixation region to the image for fixation region, it is feasible to prevent an error in dividing the fixation region and the non-fixation region according to the first fixation coordinate and incongruous visual effect which are caused by the rapid change of the human eye coordinate.

In a case that the second preset condition is not met, it is determined that the first fixation coordinate does not change abnormally. At this time, refresh continues to be performed with the next frame of image transmitted by the first processor.

In a case that the first fixation coordinate changes abnormally, refresh is performed to display the previous frame of the image for non-fixation region.

When the displayed current frame of image is an image for fixation region or an image for non-fixation region, if the first fixation coordinate changes abnormally, a new frame of image for fixation region is not received, and the stored image for non-fixation region is directly called for refresh, which enables the visual effect to be coordinating.

It is understandable that after the stored image for non-fixation region is used for perform refresh to enable the visual effect to be coordinating, a new frame of image for fixation region may be received.

In some cases, when the fixation coordinate and the current display scene are the same as those corresponding to the previous frame of image, the first processor transmits an image for fixation region that needs to be displayed by the display device according to the fixation coordinate and does not transmit an image for non-fixation region. Therefore, in a case that the fixation coordinate and the current display scene remain unchanged, it is feasible to continuously perform refresh by using images for fixation region. However, when the images for fixation region are used to perform refresh too many times, it may cause poor display effects such as pixel leakage. In the embodiments, when the number of images for fixation region continuously used for performing refresh reaches a certain number of frames, a new frame of image for non-fixation region is used to perform refresh to avoid poor display effects such as pixel leakage. In addition, it can also prevent error display in the fixation region, such as temporary screen abnormality, caused by rapid change of the human eye coordinate in a case of continuously performing refresh with images for fixation region. Therefore, this method may also include the following step.

Step S150 includes: in a case that the number of images for fixation region continuously used for performing refresh and display reaches a preset number of frames, performing refresh and display by using a previous frame of image for non-fixation region.

The preset number of frames n may be a frame number threshold configured by the display device, and the specific value of n may be determined according to the test of the display device. For example, through test, the number of frames, after which a frame of image for non-fixation region is needed for performing refresh to avoid pixel leakage, is determined.

In practical applications, the display device may record, through a counter F1, the number of images for fixation region continuously used for performing refresh and display. When the preset number of frames n is reached, the previous frame of image for non-fixation region is used to perform refresh and displayed, and the counter F1 is cleared.

It is understandable that when the head rotates, the display scene may change, and when the human eye moves, the fixation coordinate may change. When the number of images for fixation region continuously used for performing refresh and display does not reach the preset number of frames, if the display scene or the fixation coordinate changes, one or more steps from step S110 to step S140 is performed.

In the display method provided by the present disclosure, the first fixation coordinate transmitted by the image acquisition device is obtained, and the second fixation coordinate and the current frame of image that are transmitted by the first processor are obtained. In the process of performing refresh and display by using the current frame of image, in a case that the current frame of image is the image for fixation region, after the number of rows refreshed for display is greater than the first preset value, whether the first fixation coordinate changes abnormally is determined according to the first preset condition; in a case that the current frame of image is the image for non-fixation region, after the number of rows refreshed for display is greater than the second preset value, whether the first fixation coordinate changes abnormally is determined according to the second preset condition. Refresh and display is performed by using a previous frame of image for non-fixation region in a case that the first fixation coordinate changes abnormally. Refresh and display is performed by using a next frame of image transmitted by the first processor in a case that the first fixation coordinate does not change abnormally. In the present disclosure, the fixation coordinate is collected through the image acquisition device, and the fixation coordinate is transmitted directly to the display device while transmitted to the first processor, so that the coordinate directly transmitted to the display device and the image and the coordinate transmitted by the first processor are combined for determining whether there is abnormal fixation coordinate change such as fast eye movement, which achieves the purpose of improving the real-time perception of the display device about the fixation point, and effectively prevents incongruous visual effect caused by error transmission of an image for fixation region in a case of fast eye movement.

Figure 4:
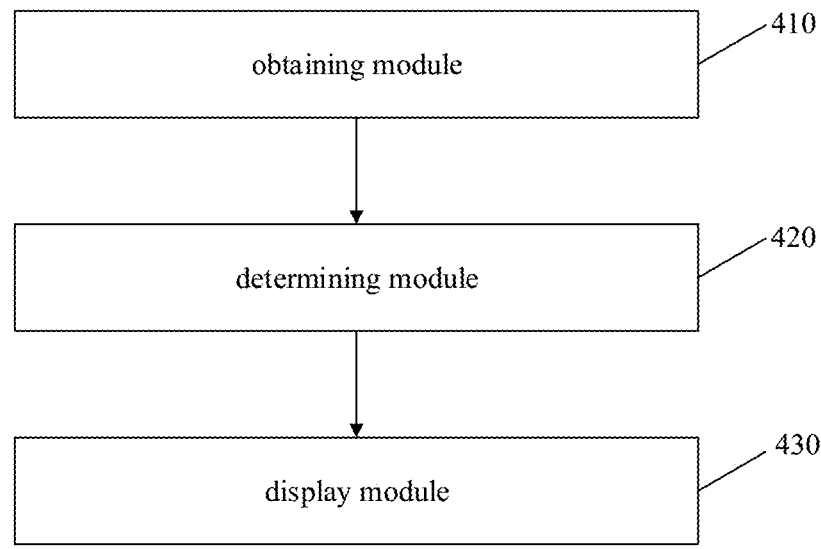
FIG. 4 is a block diagram of a display device provided by embodiments of the present disclosure.

FIG. 4 shows a block diagram of a display device. As shown in FIG. 4, the embodiments provide a display device, including:

an obtaining module 410, configured to obtain a first fixation coordinate transmitted by an image acquisition device, and obtain a second fixation coordinate and a current frame of image that are transmitted by a first processor, where the current frame of image is an image for fixation region or an image for non-fixation region generated by the first processor based on the second fixation coordinate;

a determining module 420, configured to determine a type of the current frame of image, and determine, based on the type, whether the first fixation coordinate changes abnormally; and a display module 430, configured to perform refresh and display by using the current frame of image; and perform refresh and display by using a previous frame of image for non-fixation region in a case that the first fixation coordinate changes abnormally, and perform refresh and display by using a next frame of image transmitted by the first processor in a case that the first fixation coordinate does not change abnormally.

It can be understood that the obtaining module 410 may be used to perform step S110, the determining module 420 may be used to perform step S130, and the display module 430 may be used to perform step S120 and step S140. For details of each step, reference may be made to the above embodiments, which is not described in detail herein.

Apparently, those skilled in the art should understand that the above modules or steps of the present disclosure may be implemented by a general computing device, and they may be integrated on a single computing device or distributed on a network formed by multiple computing devices. In some embodiments, they may be implemented with program codes executable by a computing device, so that they may be stored in a storage device for execution by the computing device. Or, they may be formed as individual integrated circuit modules. Or, multiple modules or steps thereof are formed as a single integrated circuit module for implementation. The present disclosure is not limited to combination of any restrictive hardware and software.

Embodiments of the present disclosure provide a storage medium on which a computer program is stored, and when the computer program is executed by one or more processors, the display method of the above embodiments is implemented.

In the embodiments, the storage medium may be implemented by any type of volatile or non-volatile storage device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

Embodiments of the present disclosure provide a display device, which includes a display panel, a memory, and a second processor. The memory stores a computer program. When the computer program is executed by the second processor, the method of the above embodiments is implemented.

In the embodiments, the display device may be an LCD display screen, an LED display screen, an OLED display screen, etc., and the second processor may be an application specific integrated circuit (ASIC) or a digital signal processor (DSP), a digital signal processing device (DSPD), a programmable logic device (PLD), a field programmable gate array (FPGA), a controller, a microcontroller, a microprocessor, or other electronic components, for executing the display method in the above embodiments. For the method implemented when the computer program is executed on the processor, reference may be made to the specific implementations of the display method provided in the above embodiments of the present disclosure, which is not described in detail herein.

Embodiment of the present disclosure provide a display system, including: the display device described above, an image acquisition device and a first processor.

The image acquisition device is configured to capture a fixation coordinate, and transmit the fixation coordinate to the display device and the first processor.

The first processor is connected to the image acquisition device and the display device, and is configured to obtain the fixation coordinate transmitted by the image acquisition device, and transmit, to the display device, the fixation coordinate obtained from the image acquisition device and the current frame of image that is to be displayed.

In some embodiments, the image acquisition device may adopt a device with an eye tracking function which can achieve high-speed refresh, for example, it may be a camera with an eye tracking function which has an acquisition frequency >90 Hz (such as OV5640 camera, which can achieve a capture frequency of 120 Hz), or it may be an eye tracking unit including a camera module having an acquisition frequency >90 Hz and a post-processing module. Through the image acquisition device, the fixation coordinate of the human eye may be collected in real time, and the collected fixation coordinate may be transmitted to the first processor and the display device. The fixation coordinate that is transmitted by the image acquisition device and obtained by the display device is the first fixation coordinate described above, and the fixation coordinate that is transmitted by the image acquisition device and is obtained by the first processor is the second fixation coordinate described above.

The first processor determines, an image to be transmitted, according to the second fixation coordinate obtained from the image acquisition device and a current scene, and divides the image to be transmitted into two frames, an image for fixation region and an image for non-fixation region, for transmission, so as to achieve refresh and display for the image for non-fixation region and the image for fixation region separately without interfering with each other. For the two frames, i.e., the image for fixation region and the image for non-fixation region, transmission is performed for each of them separately, and then refresh and display are performed with each of them separately. Refresh may be performed with one frame of image for fixation region and then refresh may be performed with one frame of image for non-fixation region; or; refresh may be performed with one frame of image for non-fixation region and then refresh may be performed with one frame of image for fixation region. The order for performing refresh is not uniquely limited.

It is understandable that, in addition to transmitting the current frame of image that needs to be displayed by the display device and the second fixation coordinate, the first processor may also transmit a line of coded data used to represent the format of the current frame of image to the display device. The format of the current frame of image includes an image for fixation region or an image for non-fixation region. The data is used to prompt the device that the current frame of image transmitted by the first processor is an image for fixation region or an image for non-fixation region.

The display system of the embodiments includes an augmented reality system (AR system) or a virtual reality system (VR system). The augmented reality system or virtual reality system using the above display method can effectively improve the real-time perception of the display device about the fixation point, so that the display device is able to perceive the fixation point in time, which prevents incongruous visual effect caused by error transmission of an image for fixation region in a case of fast eyes movement. As a result, the user experience of the augmented reality system or virtual reality system is effectively improved.

In the embodiments of the present disclosure, it should be understood that the disclosed system and method may be implemented in other ways. The system and method embodiments described above are merely illustrative.

It should be noted that in the present disclosure, the terms "including," "having" or any other variation thereof, are intended to cover a non-exclusive inclusion, such that a process, method, article, or apparatus that includes a list of elements includes not only those elements but also other elements not expressly listed, or also includes elements inherent to such process, method, article, or apparatus. Without more limitations, an element defined by the statement "include a . . . " does not rule out there are additional identical elements in the process, method, article or apparatus including the element.

Although the embodiments of the present disclosure are described as above, the content as provided is only the embodiments adopted to facilitate the understanding of the present disclosure and is not intended to limit the present disclosure. Those skilled in the art of the present disclosure may make various modifications and changes in the form and details of the implementations without departing from the spirit and scope of the present disclosure, and the scope of the present disclosure is defined by the claims.

What is claimed is:

1. A display method, comprising:
   obtaining a first fixation coordinate transmitted by an image acquisition device, and dividing a region of a display panel of a display device into a fixation region and a non-fixation region according to the first fixation coordinate, wherein the first fixation coordinate is an eye fixation coordinate collected through the image acquisition device and transmitted to the display device;
   obtaining a second fixation coordinate and a current frame of image that are transmitted by a first processor, wherein the current frame of image is an image for fixation region or an image for non-fixation region generated by the first processor based on the second fixation coordinate, wherein the image for fixation region is an image to be displayed in the fixation region of the display panel or the image for non-fixation region is an image to be displayed in the non-fixation region of the display panel, and the second fixation coordinate is an eye fixation coordinate collected through the image acquisition device and transmitted to the first processor;
   performing refresh and display by using the current frame of image;
   determining a type of the current frame of image, and determining, based on the type, whether the first fixation coordinate changes abnormally; and
   performing refresh and display by using a previous frame of image for non-fixation region in a case that the first fixation coordinate changes abnormally, and performing refresh and display by using a next frame of image transmitted by the first processor in a case that the first fixation coordinate does not change abnormally;
   wherein the determining the type of the current frame of image, and determining, based on the type, whether the first fixation coordinate changes abnormally comprises:
   in a case that the type of the current frame of image is the image for fixation region, after the number of rows refreshed for display is greater than a first preset value and when a first preset condition is met, determining that the first fixation coordinate changes abnormally;
   in a case that the type of the current frame of image is the image for non-fixation region, after the number of rows refreshed for display is greater than a second preset value and when a second preset condition is met, determining that the first fixation coordinate changes abnormally.

2. The display method according to claim 1, wherein, the determining that the first fixation coordinate changes abnormally when the first preset condition is met comprises:
   when the first fixation coordinate is updated and a value of a difference between the updated first fixation coordinate and the second fixation coordinate is greater than a first threshold, determining whether the next frame of image is an image for fixation region; and
   when the next frame of image is the image for fixation region, and the value of the difference is greater than a second threshold, determining that the first fixation coordinate changes abnormally.

3. The display method according to claim 2, wherein the second preset condition comprises: the first fixation coordinate is updated; and the next frame of image is an image for fixation region, and a value of a difference between the updated first fixation coordinate and the second fixation coordinate is greater than a third threshold.

4. The display method according to claim 1, wherein in a case that the current frame of image is the image for fixation region, the performing refresh and display by using the current frame of image comprises:
   scanning, by a row scan controller, pixels in each row for the image for fixation region, and turning off a column scan controller corresponding to an image for non-fixation region in the same row as the image for fixation region.

5. The display method according to claim 1, wherein in a case that the current frame of image is the image for non-fixation region, the performing refresh and display by using the current frame of image comprises:
   scanning, by a row scan controller, according to a preset number of rows simultaneously to perform refresh by using the image for non-fixation region so as to display the image for non-fixation region in pixels in the non-fixation region of the entire display panel of the display device, and storing the current frame of image for non-fixation region.

6. The display method according to claim 1, wherein in a case that the number of images for fixation region continuously used for performing refresh and display reaches a preset number of frames, performing refresh and display by using a previous frame of image for non-fixation region.

7. A display device, comprising a display panel, a memory, and a second processor, wherein the memory stores a program, and the program, when executed by the second processor, performs the following steps:

obtaining a first fixation coordinate transmitted by an image acquisition device, and dividing a region of the display panel of the display device into a fixation region and a non-fixation region according to the first fixation coordinate, wherein the first fixation coordinate is an eye fixation coordinate collected through the image acquisition device and transmitted to the display device;

obtaining a second fixation coordinate and a current frame of image that are transmitted by a first processor, wherein the current frame of image is an image for fixation region or an image for non-fixation region generated by the first processor based on the second fixation coordinate, wherein the image for fixation region is an image to be displayed in the fixation region of the display panel or the image for non-fixation region is an image to be displayed in the non-fixation region of the display panel, and the second fixation coordinate is an eye fixation coordinate collected through the image acquisition device and transmitted to the first processor;

performing refresh and display by using the current frame of image;

determining a type of the current frame of image, and determining, based on the type, whether the first fixation coordinate changes abnormally; and performing refresh and display by using a previous frame of image for non-fixation region in a case that the first fixation coordinate changes abnormally, and performing refresh and display by using a next frame of image transmitted by the first processor in a case that the first fixation coordinate does not change abnormally;

wherein the determining the type of the current frame of image, and determining, based on the type, whether the first fixation coordinate changes abnormally comprises:

in a case that the type of the current frame of image is the image for fixation region, after the number of rows refreshed for display is greater than a first preset value and when a first preset condition is met, determining that the first fixation coordinate changes abnormally;

in a case that the type of the current frame of image is the image for non-fixation region, after the number of rows refreshed for display is greater than a second preset value and when a second preset condition is met, determining that the first fixation coordinate changes abnormally.

8. The display device according to claim 7,
wherein, the determining that the first fixation coordinate changes abnormally when the first preset condition is met comprises:

when the first fixation coordinate is updated and a value of a difference between the updated first fixation coordinate and the second fixation coordinate is greater than a first threshold, determining whether the next frame of image is an image for fixation region; and when the next frame of image is the image for fixation region, and the value of the difference is greater than a second threshold, determining that the first fixation coordinate changes abnormally.

9. The display device according to claim 8,
wherein the second preset condition comprises: the first fixation coordinate is updated;

and the next frame of image is an image for fixation region, and a value of a difference between the updated first fixation coordinate and the second fixation coordinate is greater than a third threshold.

10. The display device according to claim 7, wherein in a case that the current frame of image is the image for fixation region, the performing refresh and display by using the current frame of image comprises:

scanning, by a row scan controller, pixels in each row for the image for fixation region, and turning off a column scan controller corresponding to an image for non-fixation region in the same row as the image for fixation region.

11. The display device according to claim 7, wherein in a case that the current frame of image is the image for non-fixation region, the performing refresh and display by using the current frame of image comprises:

scanning, by a row scan controller, according to a preset number of rows simultaneously to perform refresh by using the image for non-fixation region so as to display the image for non-fixation region in pixels in the non-fixation region of the entire display panel of the display device, and storing the current frame of image for non-fixation region.

12. The display device according to claim 7, wherein in a case that the number of images for fixation region continuously used for performing refresh and display reaches a preset number of frames, performing refresh and display by using a previous frame of image for non-fixation region.

13. A display system, comprising:
an image acquisition device;
a first processor; and,
the display device according to claim 7;
wherein the image acquisition device is configured to capture a fixation coordinate, and transmit the fixation coordinate to the display device and the first processor;
wherein the first processor is connected to the image acquisition device and the display device, and is configured to obtain the fixation coordinate transmitted by the image acquisition device, and transmit, to the display device, the fixation coordinate obtained from the image acquisition device and the current frame of image that is to be displayed.

14. The display system according to claim 13, wherein the display system is an augmented reality system or a virtual reality system.

15. A non-transitory storage medium, having a program stored thereon, wherein the program, when executed by one or more processors, performs the method according to claim 1.

16. The non-transitory storage medium according to claim 15,
wherein, the determining that the first fixation coordinate changes abnormally when the first preset condition is met comprises:

when the first fixation coordinate is updated and a value of a difference between the updated first fixation coordinate and the second fixation coordinate is greater than a first threshold, determining whether the next frame of image is an image for fixation region; and when the next frame of image is an-the image for fixation region, and the value of the difference is greater than a second threshold, determining that the first fixation coordinate changes abnormally.

17. The non-transitory storage medium according to claim 16,
wherein the second preset condition comprises: the first fixation coordinate is updated;

and the next frame of image is an image for fixation region, and a value of a difference between the updated first fixation coordinate and the second fixation coordinate is greater than a third threshold.

18. The non-transitory storage medium according to claim 15, wherein in a case that the current frame of image is the image for fixation region, the performing refresh and display by using the current frame of image comprises:
scanning, by a row scan controller, pixels in each row for the image for fixation region, and turning off a column scan controller corresponding to an image for non-fixation region in the same row as the image for fixation region.

19. The non-transitory storage medium according to claim 15, wherein in a case that the current frame of image is the image for non-fixation region, the performing refresh and display by using the current frame of image comprises:
scanning, by a row scan controller, according to a preset number of rows simultaneously to perform refresh by using the image for non-fixation region so as to display the image for non-fixation region in pixels in the non-fixation region of the entire display panel of the display device, and storing the current frame of image for non-fixation region.

20. The non-transitory storage medium according to claim 15, wherein in a case that the number of images for fixation region continuously used for performing refresh and display reaches a preset number of frames, performing refresh and display by using a previous frame of image for non-fixation region.

* * * * *